United States Patent
Dudar et al.

(10) Patent No.: US 10,955,278 B2
(45) Date of Patent: Mar. 23, 2021

(54) SYSTEM AND METHODS FOR ULLAGE SPACE FUEL LEVEL ESTIMATION

(71) Applicant: Ford Global Technologies, LLC, Dearborn, MI (US)

(72) Inventors: Aed M. Dudar, Canton, MI (US); Damien Baldwin, Belleville, MI (US); Dennis Seung-Man Yang, Canton, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 955 days.

(21) Appl. No.: 14/168,916

(22) Filed: Jan. 30, 2014

(65) Prior Publication Data

US 2015/0211914 A1    Jul. 30, 2015

(51) Int. Cl.
| | | |
|---|---|---|
| G01F 23/00 | (2006.01) | |
| G01F 23/24 | (2006.01) | |
| B60K 15/03 | (2006.01) | |
| F02M 25/08 | (2006.01) | |

(52) U.S. Cl.
CPC ...... G01F 23/246 (2013.01); B60K 15/03006 (2013.01); *B60K 2015/03217* (2013.01); *B60K 2015/03256* (2013.01); *B60K 2015/03368* (2013.01); *F02M 25/08* (2013.01)

(58) Field of Classification Search
CPC ............... G01F 23/246; G01K 13/00; B60K 15/03006; B60K 2015/03256; B60K 2015/03368; B60K 2015/03217; B60K 2015/03019; F02M 25/08

USPC .......................................................... 73/292
See application file for complete search history.

(56) References Cited

U.S. PATENT DOCUMENTS

| | | | | |
|---|---|---|---|---|
| 5,113,834 A | * | 5/1992 | Aramaki | ............ F02M 25/0809 |
| | | | | 123/198 D |
| 6,378,505 B1 | | 4/2002 | Doering et al. | |
| 6,612,324 B2 | | 9/2003 | Szlaga | |
| 7,233,845 B2 | | 6/2007 | Veinotte | |
| 7,347,191 B2 | | 3/2008 | Atwood et al. | |
| 7,469,684 B2 | | 12/2008 | Leone et al. | |
| 7,484,500 B2 | | 2/2009 | Terada | |
| 8,751,140 B2 | * | 6/2014 | Surnilla | ................. G01C 21/26 |
| | | | | 701/123 |
| 2007/0277788 A1 | * | 12/2007 | Egawa | ..................... B01J 20/20 |
| | | | | 123/519 |
| 2010/0101311 A1 | * | 4/2010 | Nakano | .............. F02M 25/0854 |
| | | | | 73/114.39 |
| 2011/0168140 A1 | * | 7/2011 | DeBastos | ........... F02M 25/0818 |
| | | | | 123/521 |
| 2014/0324284 A1 | * | 10/2014 | Glinsky | ................... G07C 3/08 |
| | | | | 701/34.4 |
| 2015/0090232 A1 | * | 4/2015 | Peters | ................ F02M 25/0854 |
| | | | | 123/520 |
| 2015/0090233 A1 | * | 4/2015 | Dudar | ................ F02M 25/0854 |
| | | | | 123/520 |

* cited by examiner

*Primary Examiner* — John Fitzgerald
*Assistant Examiner* — Rodney T Frank
(74) *Attorney, Agent, or Firm* — Geoffrey Brumbaugh; McCoy Russell LLP

(57) ABSTRACT

A method for a vehicle, comprising: indicating a true fill level of a fuel tank based on a fuel vapor canister temperature profile during a refueling event. In this way, a quantity fuel dispensed over the maximum fill level of the fuel tank may be accounted for, regardless of the fuel level sensor reading.

20 Claims, 6 Drawing Sheets

SYSTEM AND METHODS FOR ULLAGE SPACE FUEL LEVEL ESTIMATION

BACKGROUND AND SUMMARY

Vehicle fuel tanks typically have a fuel level sensor which provides an estimate of the amount of fuel stored in the fuel tank. The fuel tank and fuel level sensor may be configured such that a maximum fuel fill level is designated that is less than the total volume of the fuel tank. The remaining volume above the maximum fuel fill level may be referred to as a vapor dome, or ullage space. The ullage space allows for the storage of fuel vapors generated in the tank without causing excessive tank pressure. The ullage space may also provide protection for the fuel tank in the event of a collision.

During a refueling event, when the fuel level sensor reaches the maximum fuel fill level, the fuel dispenser may be automatically shut off, to prevent the filling of the ullage space. However, the refueling operator may choose to further "trickle-fill" or "top off" the fuel tank by slowly adding fuel above the maximum fuel level without triggering another automatic shutoff event. In this scenario, the fuel level sensor will still indicate that the fuel fill level is equal to the maximum fuel fill level, even if more fuel is present. In some cases, the ullage space may hold up to 2-3 additional gallons of fuel above the maximum fuel fill level.

Underestimating the amount of fuel in the fuel tank may have additional downstream consequences. Many vehicles provide the operator an estimate of "miles-to-empty" on a dashboard control panel. Inaccurate estimates may lead vehicle operators to alter their trip planning unnecessarily, or may cause the operators to disregard the estimates completely. Additionally, fuel level sensor diagnostics often compare fuel level sensor readings with expected readings based on fuel consumed. If the fuel tank is overfilled (and in particular, if the fuel tank is consistently overfilled after short trips) the fuel level sensor may continuously report 100% fill level, leading to the setting of a diagnostic code, even if the sensor is working properly.

The inventors herein have identified the above problems, and have developed systems and methods to at least partially address them. In one example, a method for a vehicle, comprising: indicating a true fill level of a fuel tank based on a fuel vapor canister temperature profile during a refueling event. In this way, a quantity fuel dispensed over the maximum fill level of the fuel tank may be accounted for, regardless of the fuel level sensor reading.

In another example, a system for a vehicle, comprising: a fuel vapor canister coupled to a fuel tank; a temperature sensor coupled to a load side of the fuel vapor canister; and a controller configured with executable instructions stored in non-transitory memory, that when executed, cause the controller to: monitor a temperature profile at the temperature sensor during a refueling event; determine a duration of a first cooling period of the temperature profile; determine a duration of a second cooling period of the temperature profile; determine a first quantity of fuel dispensed into the fuel tank based on the duration of the first cooling period; determine a second quantity of fuel dispensed into the fuel tank based on the duration of the second cooling period; and determine a true fill level of a fuel tank based on a sum of the first quantity of fuel, the second quantity of fuel, and a fill level immediately prior to refueling. In this way, the fuel vapor entering the fuel vapor canister during a refueling event may be leveraged to determine the amount of fuel dispensed into the fuel tank. The cooling periods observed by a temperature sensor disposed at the load side of the fuel vapor canister are proportionate to the amount of fuel dispensed. Thus, even if fuel is added to the ullage space of the fuel tank, an accurate assessment of the tank fill level can be obtained.

In yet another example, a method for a fuel system of a vehicle, comprising: monitoring a temperature profile at a temperature sensor coupled to a load side of a fuel vapor canister during a refueling event; determining a duration of a first cooling period of the temperature profile; determining a duration of a second cooling period of the temperature profile; determining a first quantity of fuel dispensed into a fuel tank based on the duration of the first cooling period; determining a second quantity of fuel dispensed into the fuel tank based on the duration of the second cooling period; determining a true fill level of a fuel tank based on a sum of the first quantity of fuel, the second quantity of fuel, and a fill level immediately prior to refueling; under a first condition, determining an expected driving range for the vehicle based on the true fill level, and not based on the fill level indicated by a fuel level sensor coupled within the fuel tank; and under the first condition, executing a diagnostic test based on the true fill level. In this way, downstream calculations and parameters that are based on the fuel fill level may be determined accurately and robustly. Expected driving range for a vehicle may take into consideration all of the fuel in the fuel tank, whereas current methods only consider fuel up to the maximum fill level, as indicated by a fuel level sensor. Diagnostic test that depend on changes in fuel level may be performed more robustly, even when the fuel level sensor reads 100% of maximum tank capacity despite fuel being present in the fuel tank ullage space above 100% of maximum tank capacity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

This description relates to systems and methods for determining an accurate fuel fill level in a fuel tank, for example a fuel tank that has been filled beyond the maximum fuel fill level. The fuel tank may be part of a fuel system for a vehicle, such as the fuel system and vehicle system shown schematically in FIG. 1. The fuel tank may be coupled to a fuel vapor canister, such as the fuel vapor canister shown schematically in FIG. 2. During a refueling event, a temperature sensor placed near the load-side of the fuel vapor canister will exhibit heating and cooling patterns proportionate to the amount of fuel dispensed, as shown by the example timelines in FIGS. 3A and 3B. The fuel vapor canister temperature profile may then be used to determine a true fuel tank fill level using a method, such as the example method shown in FIG. 4. The true fuel tank fill level may then be used for downstream calculations, as shown in FIG. 5A, and in determining the integrity of the fuel level sensor, as shown in FIG. 5B. It should be understood that the true fill level determined may be different from the measured or otherwise calculated fill level.

Figure 1:
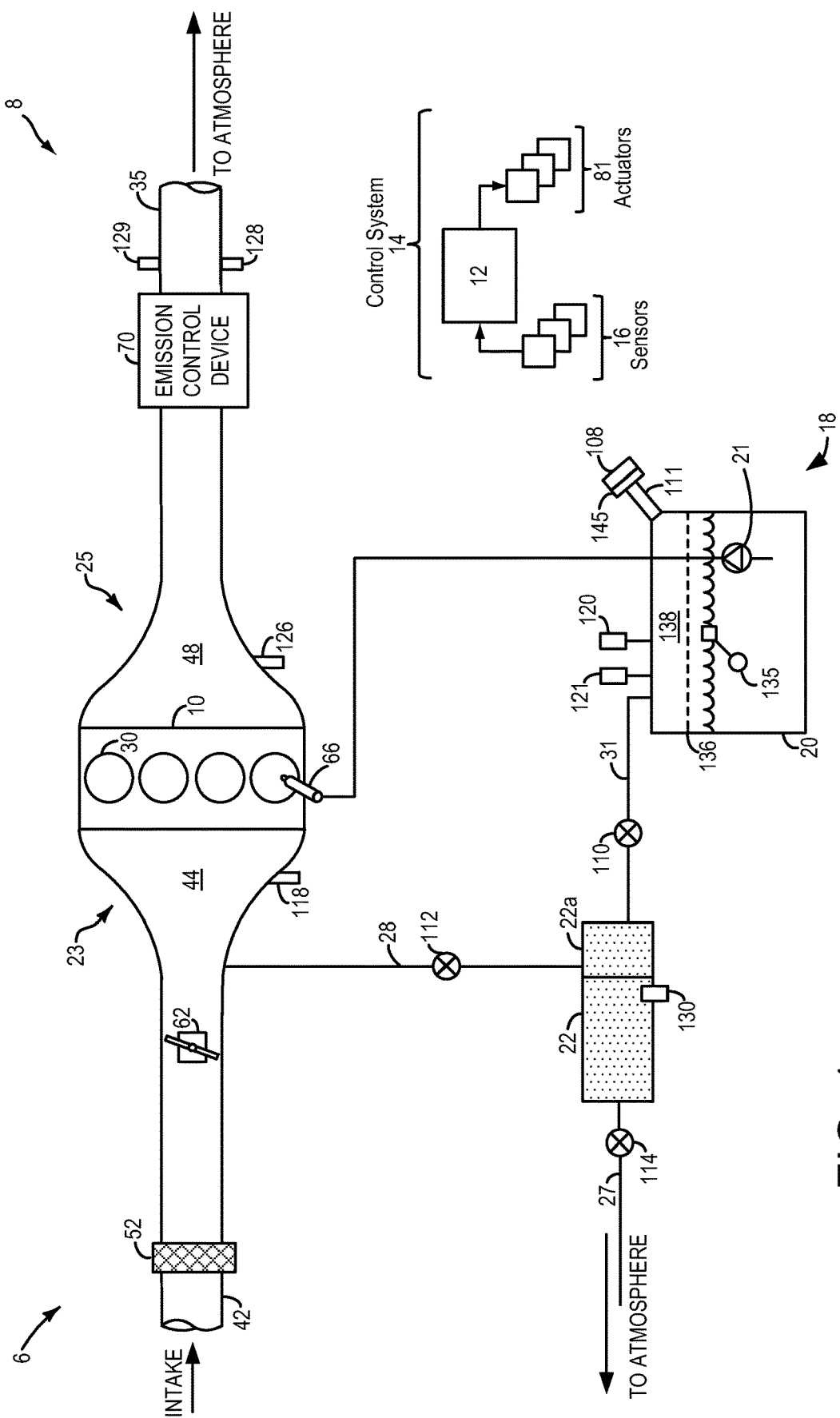
FIG. 1 shows a schematic depiction of a fuel system coupled to an engine system.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through fuel filler pipe 111 via refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 135 located in fuel tank 20 may provide an indication of the fuel level ("Fuel Level Input") to controller 12. As depicted, fuel level sensor 135 may comprise a float connected to a variable resistor. Alternatively, other types of fuel level sensors may be used.

Fuel tank 20 may include a maximum fill level 136 that is less than the overall capacity of the fuel tank. This may allow for fuel vapor storage within the fuel tank within ullage space 138 (also referred to as a "vapor dome"). Further, ullage space 138 may protect the fuel tank during a collision, for example. Fuel level sensor 135 may be configured to alert controller 12 when fuel reaches maximum fill level 136. This may, in turn trigger an automatic shut-off of a refueling pump coupled to refueling port 108. However, as described further herein, users controlling the refueling pump often choose to "trickle-fill" additional fuel into fuel tank 20 after an initial automatic shut-off. As such, fuel tank 20 may hold fuel above maximum fill level 136. However, fuel level sensor 135 may not be configured to distinguish between fuel levels once the maximum fill level has been breached.

Further, fuel system 18 may include refueling lock 145. In some embodiments, refueling lock 145 may be a fuel cap locking mechanism. The fuel cap locking mechanism may be configured to automatically lock the fuel cap in a closed position so that the fuel cap cannot be opened. For example, the fuel cap may remain locked via refueling lock 145 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 145 may be a filler pipe valve located at a mouth of fuel filler pipe 111. In such embodiments, refueling lock 145 may not prevent the removal of a fuel cap. Rather refueling lock 145 may prevent the insertion of a refueling pump into fuel filler pipe 111. The filler pipe valve may be electrically locked, for example by a solenoid, or mechanically locked, for example by a pressure diaphragm.

In some embodiments, refueling lock 145 may be refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 145 is locked using an electrical mechanism, refueling lock 145 may be unlocked by commands from controller 12, for example, when a fuel tank pressure decreases below a pressure threshold. In embodiments where refueling lock 145 is locked using a mechanical mechanism, refueling lock 145 may be unlocked via a pressure gradient, for example, when a fuel tank pressure decreases to atmospheric pressure.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 may include a canister temperature sensor 130 configured to provide an indication of the temperature within the canister to controller 12. In some examples, multiple temperature sensors may be coupled to canister 22 in order to provide a detailed representation of canister temperature to controller 12. Further description of the placement of canister temperature sensor 130 may be found herein and with regards to FIG. 2. Canister temperature sensor 130 may be used to infer the canister load, as the adsorption of fuel vapors to the adsorbent within the canister is an exothermic reaction. Likewise, desorption of fuel vapors from the adsorbent is endothermic. Other sensors, such as oxygen sensors and/or hydrocarbon sensors may be coupled to canister 22, canister buffer 22a, conduits 31, and/or purge line 28 in order to derive more detailed information about the fuel vapor entering or exiting the fuel vapor canister.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid. In some examples, an air filter may be coupled in vent 27 between canister vent valve 114 and atmosphere.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20. The fuel system may be considered to be sealed when isolation valve 110 is closed. In embodiments where the fuel system does not include isolation valve 110, the fuel system may be considered sealed when purge valve 112 and canister vent valve 114 are both closed.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. For example, ambient temperature and pressure sensors may be coupled to the exterior of the vehicle body. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regards to FIGS. 4 and 5A-B.

Figure 2:
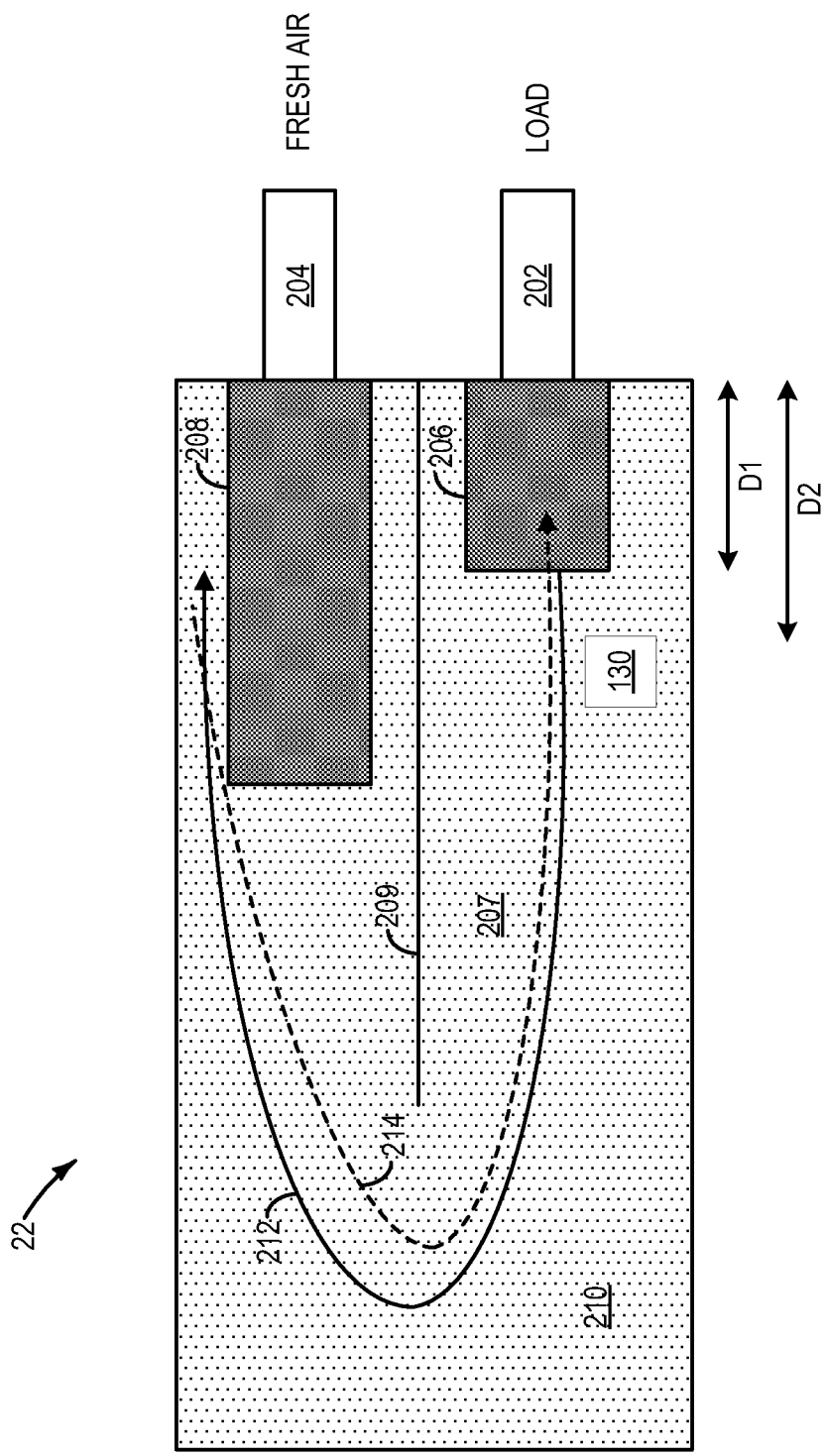
FIG. 2 shows a schematic depiction of a fuel vapor canister.

FIG. 2 shows a detailed schematic diagram of an example fuel vapor canister 22. Canister 22 may comprise a load input 202 that may be coupled to fuel tank 20 via conduit 31, as shown in FIG. 1. In some examples, load input 202 may be coupled to a canister buffer, such as canister buffer 22a as shown in FIG. 1. Canister 22 may further comprise a fresh air input that may be coupled to atmosphere via vent 27, as show in FIG. 1. Load input 202 may facilitate the flow of fuel vapor into and out of canister 22 via load conduit 206. Load conduit 206 may extend into the central cavity of canister 22. Similarly, fresh air input 204 may facilitate the flow of fresh air into canister 22 via fresh air conduit 208. Fresh air conduit 208 may extend into central cavity 207 of canister 22. Fresh air conduit 208 may extend further into central cavity 207 than does load conduit 206. In some examples, a partition 209 may extend between fresh air conduit 208 and load conduit 206 to facilitate distribution of fuel vapor and fresh air throughout central cavity 207, though partition 209 may not completely isolate the fresh air side of canister 22 from the load side.

Canister 22 may be filled with an adsorbent material 210. Adsorbent material 210 may comprise any suitable material for temporarily trapping fuel vapors (including vaporized hydrocarbons) generated during fuel tank refueling operations, as well as diurnal vapors. In one example, adsorbent material 210 is activated charcoal.

Line 212 represents the trajectory of fuel vapor entering canister 22 via load conduit 206, during adsorption, such as during a refueling event, for example. Adsorbent material 210 located nearest to load conduit 206 will become saturated with fuel vapor prior to adsorbent material 210 located proximal to fresh air conduit 208. Line 214 represents the trajectory of fuel vapor exiting canister 22 via load conduit 206, during desorption, such as during a purging event, for example. Adsorbent material 210 located nearest to fresh air conduit 208 will desorb hydrocarbons prior to adsorbent material 210 located proximal to load conduit 206.

As described herein and with regards to FIG. 1, canister 22 may include one or more temperature sensors 130. In the example shown in FIG. 2, canister 22 includes exactly one temperature sensor 130, located proximal to load conduit 206. In this way, temperature sensor 130 may provide a representation of the temperature of adsorbent material 210 located proximal to load conduit 206. In this example, load conduit 206 extends a distance D1 from load input 202 into central cavity 207, while temperature sensor 130 is located at a distance D2 from load input 202. As one example, D1 may be 55 mm, and D2 may be 60 mm, placing temperature sensor 130 approximately 5 mm away from the exit of load conduit 206. However, other distances and dimensions may be used based on the canister configuration and further based on the desired information to be gauged by temperature sensor 130.

In this configuration shown in FIG. 2, measurements from temperature sensor 130 may provide an indication of the amount of fuel delivered to fuel tank 20 during a refueling event. During a refueling event, adsorbent proximal to temperature sensor 130 will give off heat during the initial adsorption of hydrocarbons, an exothermic reaction. In many situations, adsorbent proximal to temperature sensor 130 will saturate with hydrocarbons prior to the end of the refueling event. As fuel vapor continues to enter canister 22, the dispersion of vapor (along line 212) will provide a primary cooling effect to the adsorbent proximal to temperature sensor 130. As such, temperature sensor 130 will observe a decrease in temperature, the duration of which correlates with the length and volume of the refueling event. At the end of the refueling event, due to manual or automatic shut-off, the diffusion of remaining fuel vapor throughout canister 22 will result in adsorbent proximal to temperature sensor 130 increasing in temperature.

In some situations, the refueling operator may elect to "trickle-fill" additional fuel into fuel tank 20 following an automatic shut-off event. As this occurs, the additional fuel vapor entering canister 22 will provide a secondary cooling effect to the adsorbent proximal to temperature sensor 130. As such, temperature sensor 130 will observe a decrease in temperature, the duration of which correlates with the length and volume of the trickle-filling event. At the end of the trickle-filling event, due to manual or automatic shut-off, the diffusion of remaining fuel vapor throughout canister 22 will result in adsorbent proximal to temperature sensor 130 increasing in temperature.

Figure 3A:
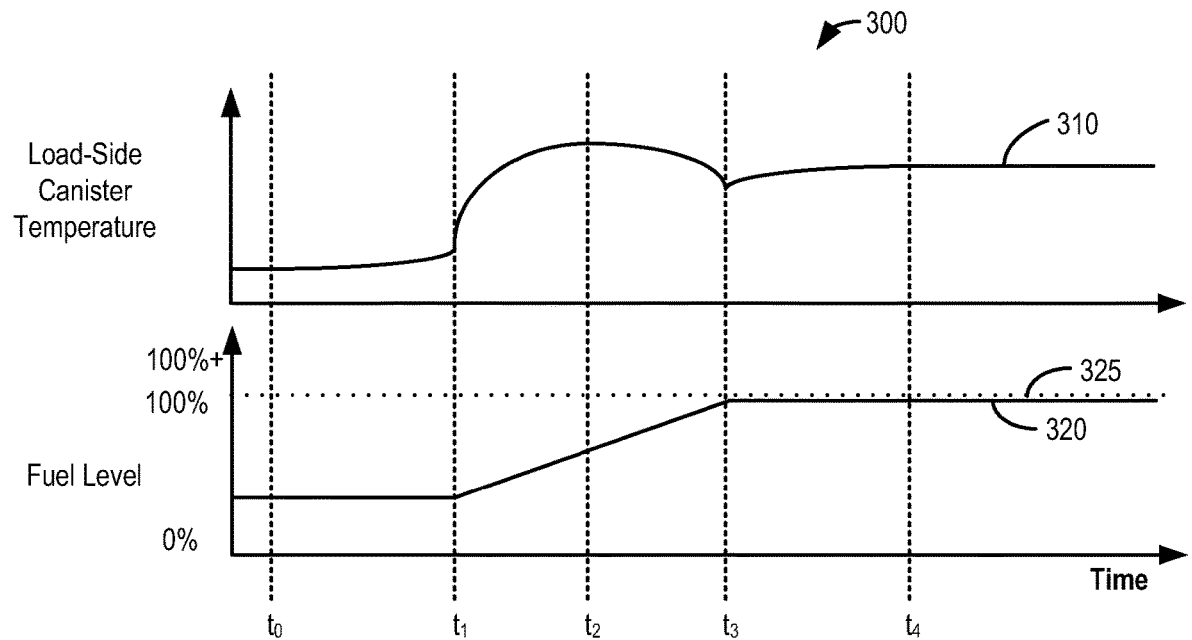
FIG. 3A shows an example timeline for a refueling event.

FIG. 3A shows an example timeline 300 for a refueling event. Timeline 300 will be described with reference to the systems described herein and depicted in FIGS. 1 and 2. Timeline 300 includes plot 310, representing load-side fuel vapor canister temperature as measured by canister temperature sensor 130, or an equivalent load-side canister temperature sensor as described herein and with regards to FIG. 2. Timeline 300 also includes plot 320, representing fuel level within a fuel tank throughout the refueling event. Timeline 300 also includes line 325, representing the maximum fill level 136 for fuel tank 20 (or 100% fuel level).

At time $t_0$, the vehicle operator requests a refueling event. In preparation for the refueling event, fuel vapor may be vented from fuel tank 20 to canister 22 by opening FTIV 110. As such, canister temperature increases with the absorbance of fuel vapors from time $t_0$ to time $t_1$ as shown by plot 310, though no fuel is dispensed, as shown by plot 320. At time $t_1$, the refueling event begins. Fuel is dispensed into fuel tank 20 from time $t_1$ to time $t_3$, as shown by plot 320. From time $t_1$ to time $t_2$, load side canister temperature increases, as shown by plot 310. At time $t_2$, the load-side adsorbent saturates with fuel vapors. However, fuel vapor continues to enter the fuel vapor canister. The additional fuel vapor cools the load-side adsorbent from $t_2$ to $t_3$, as shown by plot 310. This may be considered a primary cooling period for the refueling event. The duration of the primary cooling period ($t_2$ to $t_3$) is proportional to the amount of fuel added to the fuel tank from time $t_1$ to time $t_3$.

At time $t_3$, the refueling event ends via an automatic-shutoff event, as the fuel level has reached 100% of the maximum fill level for fuel tank 20. From $t_3$ to $t_4$, fuel vapor within canister 22 diffuses throughout the canister, slightly increasing the load side canister temperature. At time $t_4$, the canister temperature has equilibrated, and no further fuel has been added to the fuel tank. The refueling event may then end.

Figure 3B:
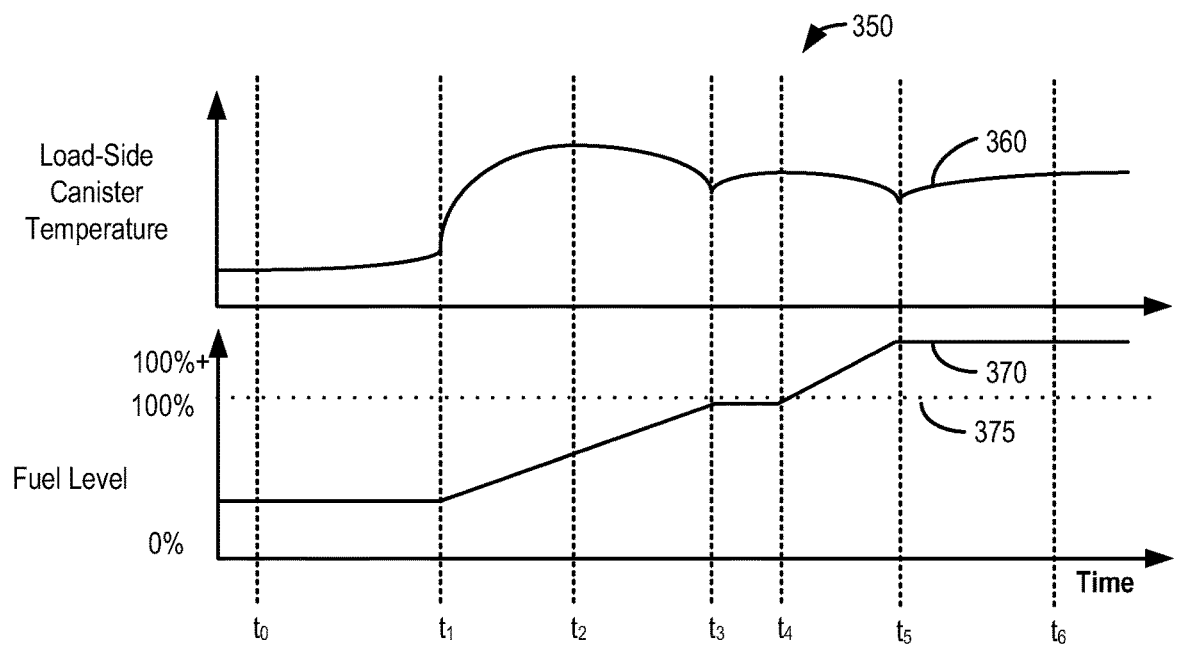
FIG. 3B shows an example timeline for a refueling event and a trickle-filling event.

FIG. 3B shows an additional example timeline 350 for a refueling event. Timeline 350 includes plot 360, representing load-side fuel vapor canister temperature as measured by canister temperature sensor 130, or an equivalent load-side canister temperature sensor as described herein and with regards to FIG. 2. Timeline 350 also includes plot 370, representing fuel level within a fuel tank throughout the refueling event. Timeline 350 also includes line 375, representing the maximum fill level 136 for fuel tank 20 (or 100% fuel level).

Timeline 350 is identical to timeline 300 from time $t_0$ through time $t_3$. Following the automatic shut-off event at time $t_3$, fuel vapor within canister 22 diffuses throughout the canister, slightly increasing the load side canister temperature, as shown by plot 360. At time $t_4$, the refueling pump operator adds additional fuel to fuel tank 20 by trickle-filling the fuel tank until time $t_5$ as shown by plot 370. The additional fuel vapor entering the canister from time $t_4$ to time $t_5$ cools the load-side adsorbent as shown by plot 360. This may be considered a secondary cooling period for the refueling event. The duration of the secondary cooling period ($t_4$ to $t_5$) is proportional to the amount of fuel added to the fuel tank from time $t_4$ to time $t_5$.

At time t5, the trickle-filling event ends. From time $t_5$ to time $t_6$, fuel vapor within canister 22 diffuses throughout the canister, slightly increasing the load side canister temperature, as shown by plot 360. At time $t_6$, the canister temperature has equilibrated, and no further fuel has been added to the fuel tank. The refueling event may then end.

Figure 4:
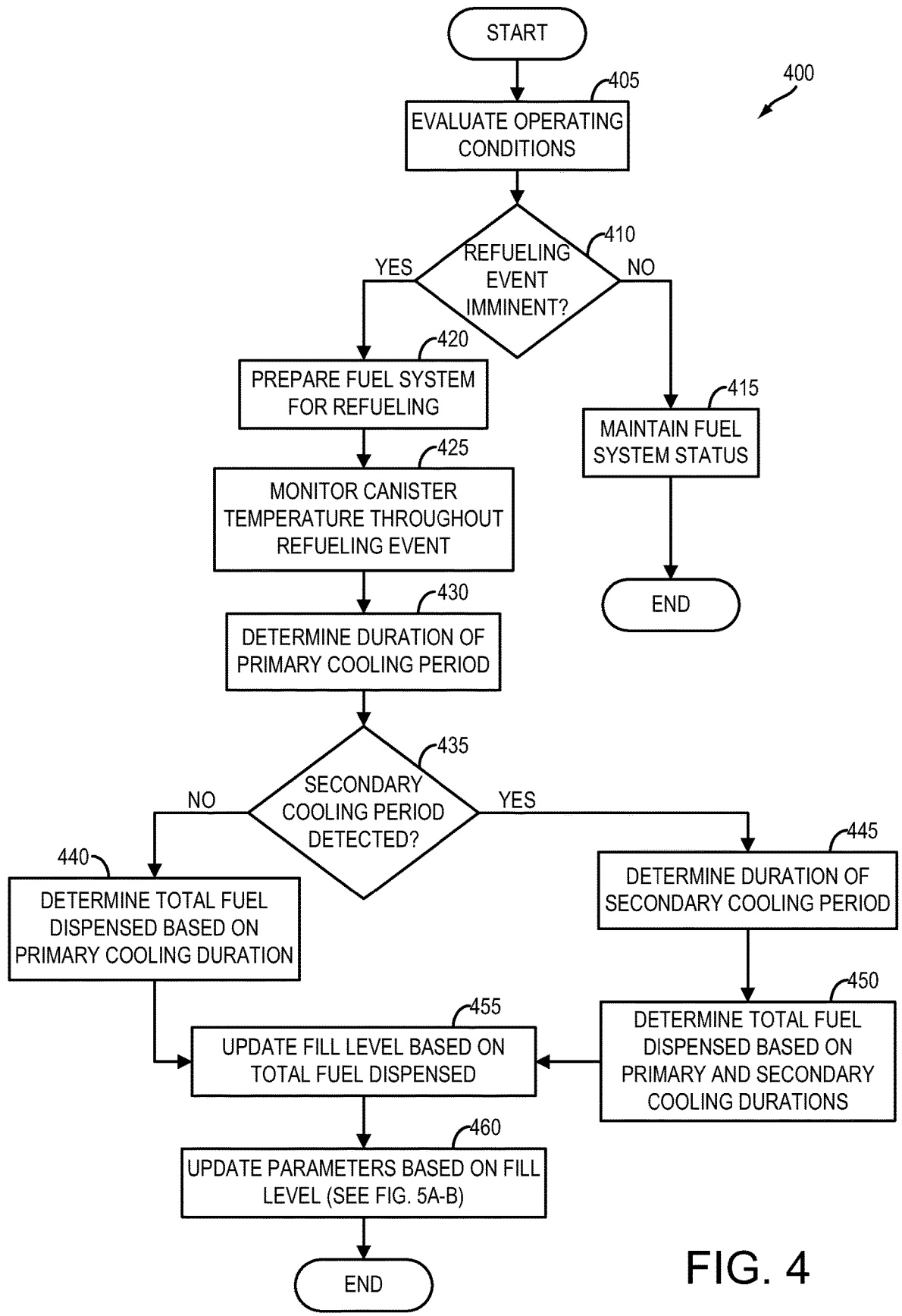
FIG. 4 shows a high-level flow chart for an example method that may be used to determine fuel tank fill level.
Figure 5A:
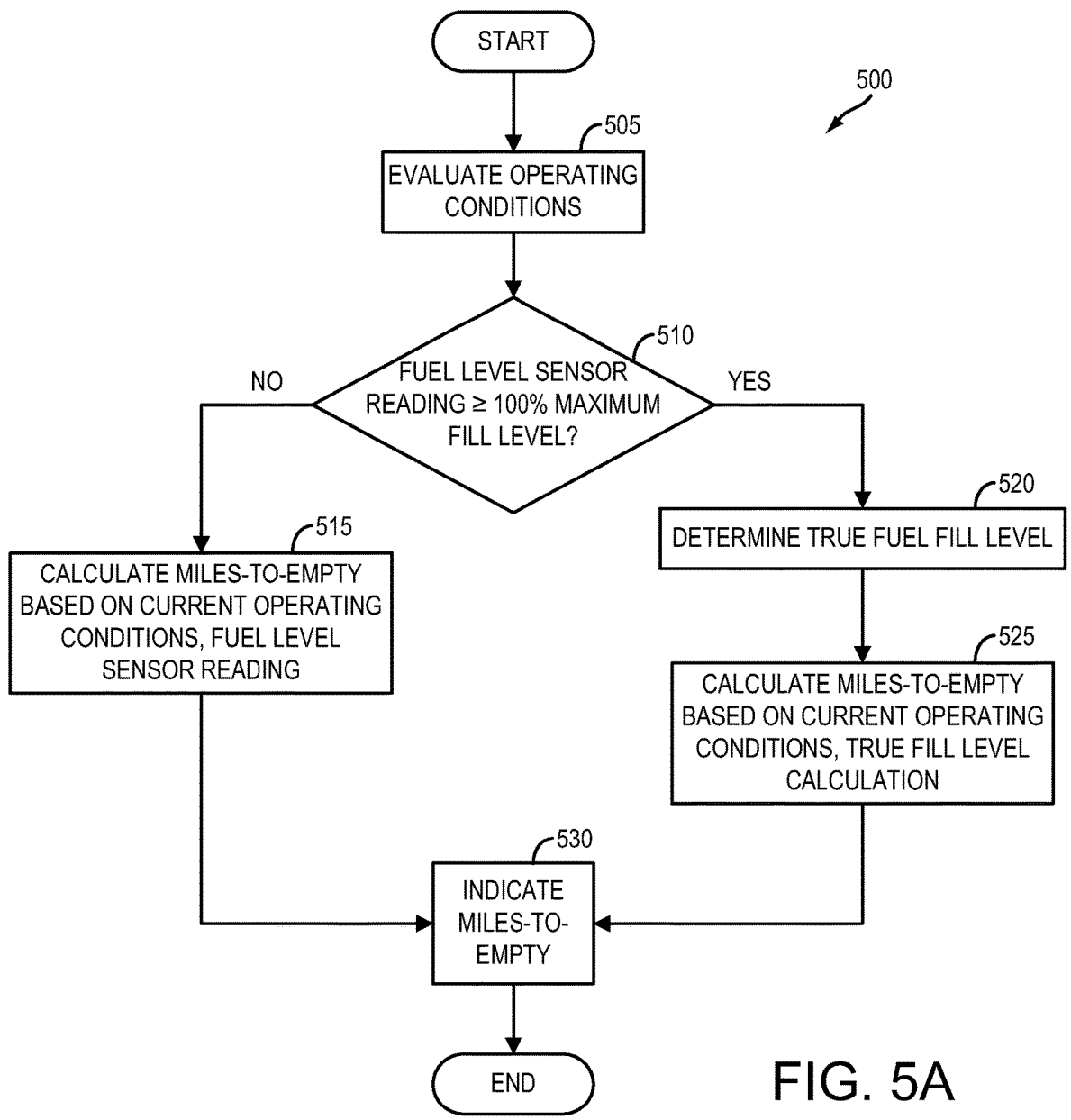
FIG. 5A shows a high-level flow chart for an example method leveraging fuel tank fill level to determine a miles-to-empty calculation.
Figure 5B:
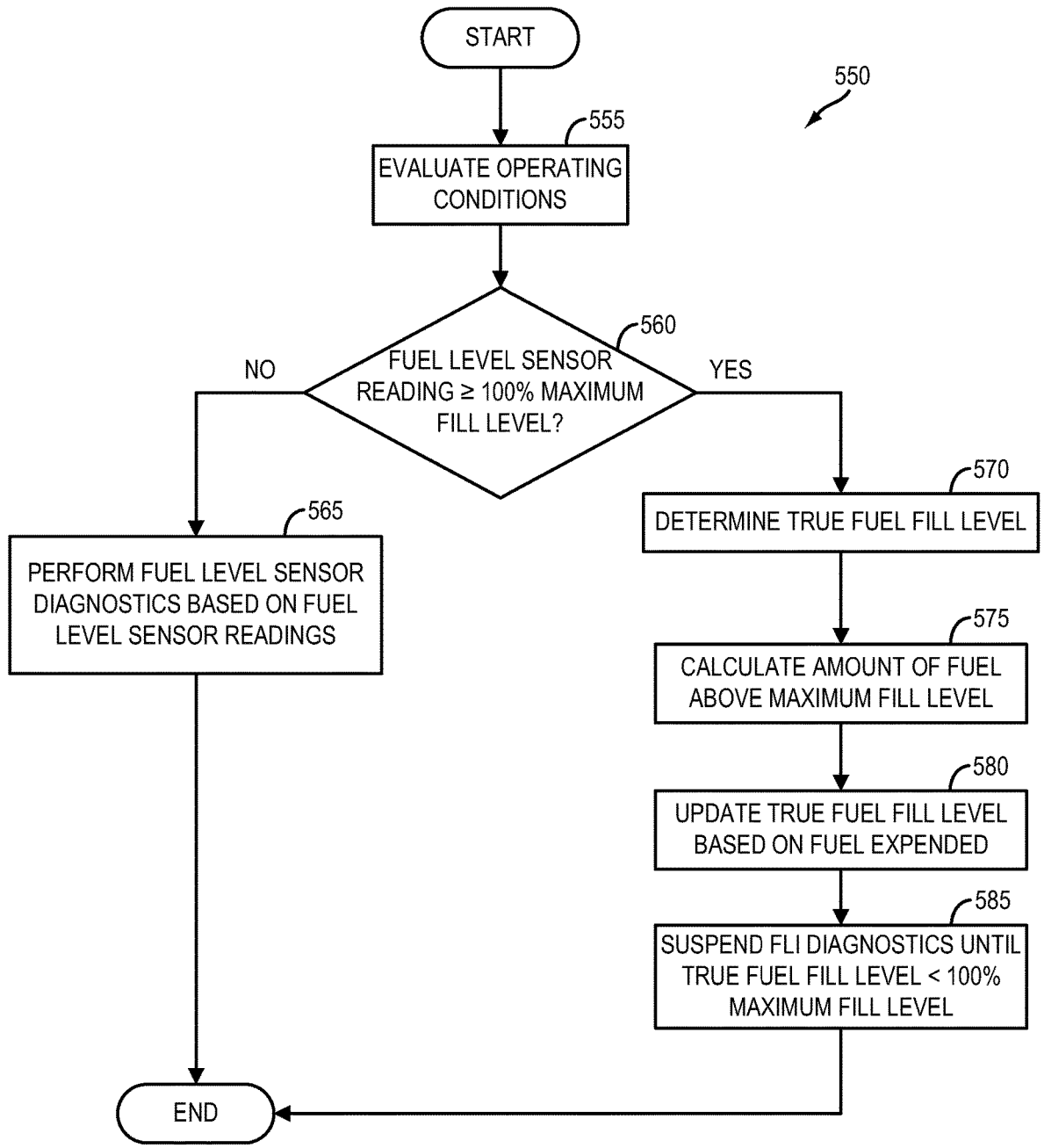
FIG. 5B shows a high-level flow chart for an example method leveraging fuel tank fill level to determine the integrity of a fuel level sensor.

FIG. 4 shows a flow chart for an example method 400 for determining and indicating a total quantity of fuel dispensed during a refueling event. In particular, method 400 may be utilized to determine and indicate a total quantity of fuel dispensed before and after an automatic shut-off event due to a fuel level sensor reaching a maximum fill level. Method 400 will be described herein with reference to the components and systems depicted in FIGS. 1 and 2, though it should be understood that the method may be applied to other systems without departing from the scope of this disclosure. Method 400 may be carried out by controller 12, and may be stored as executable instructions in non-transitory memory. Indicating a fuel level, fuel parameter, or fuel quantity, as described herein may be accomplished by setting a parameter stored in memory at controller 12, by setting a parameter on a CAN bus that is communicated to one or more of the various processors on the network, and/or via a visual display to an operator of the vehicle.

Method 400 may begin at 405. At 405, method 400 may include evaluating operating conditions. Operating conditions may include, but are not limited to, fuel fill level, canister load level, engine operating status, fuel tank pressure, vehicle location (as determined through an on board GPS, for example), etc. Operating conditions may be measured by one or more sensors 16 coupled to controller 12, or may be estimated or inferred based on available data.

Continuing at 410, method 400 may include determining whether a refueling event is imminent. Determining whether a refueling event is imminent may include detecting a refueling request. For example, hybrid vehicle 6 may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In another example, the vehicle operator may request directions to a refueling station via the on-board GPS. In other examples, a refueling event may be inferred by the vehicle operator (or a refueling attendant) opening a refueling door, attempting to remove a fuel cap, or otherwise attempting to gain access to refueling port 108.

If it is determined that no refueling request is imminent, method 400 may proceed to 415. At 415, method 400 may include maintaining the status of fuel system 18. Method 400 may then end. If it is determined that a refueling request is imminent, method 400 may proceed to 420. At 420, method 400 may include preparing the fuel system for a refueling event. Preparing the fuel system for a refueling event may include placing fuel system 18 and engine system 8 in a refueling mode. As described herein and with regards to FIG. 1, a refueling mode may include closing CPV 112, opening CVV 114, and opening FTIV 110. In this way, fuel vapor currently stored in fuel tank 20 may be vented to canister 22, and subsequent fuel vapor generated during the refueling event may also be vented to canister 22. Air stripped of fuel vapor may exit canister 22 to atmosphere through vent 27. Preparing the fuel system for refueling may further include unlocking refueling lock 145 following placing fuel system 18 and engine system 8 in a refueling mode.

Continuing at 425, method 400 may include monitoring the temperature of the fuel vapor canister throughout the duration of the refueling event. As described herein with regards to FIGS. 1-2 and 3A-B, fuel vapor canister temperature may be monitored with a single temperature sensor 130 located at the load side of the canister. In other examples, two or more canister temperature sensors may be used. Temperature measurements may be taken continuously, or periodically during refueling. Temperature measurements may be relayed and stored in memory at controller 12. Monitoring canister temperature may further include identifying one or more heating and/or cooling inflection points, as described herein with regards to FIGS. 2 and 3A-B (e.g. time points where the temperature measurements change from progressively increasing to progressively decreasing, or vice-versa).

Continuing at 430, method 400 may include determining and/or indicating the duration of the primary cooling period, based on the canister temperature measurements taken during the refueling event. As described herein with regards to FIGS. 2 and 3A-B, the primary cooling period represents a time period where adsorbent material closest to temperature sensor 130 is saturated and being cooled by fuel vapors flowing across the load side region. The primary cooling period may end when the fuel dispenser is shut off, either manually or via an automatic shutoff event. The duration of the primary cooling period may be quantified by determining the amount of time between a first set of inflection points in the canister temperature sensor profile, where the temperature is decreasing.

Continuing at 435, method 400 may include determining and/or indicating whether a secondary cooling period is detected. As described herein with regards to FIGS. 2 and 3A-B, the secondary cooling period may occur while trickle filling a fuel tank beyond the maximum fill level, or may occur if the fuel dispenser is shut off prior to reaching the maximum fill level, and then more fuel is subsequently dispensed. The secondary cooling period may be identified as a period following the primary cooling period where the canister temperature sensor 130 registers a decrease in temperature. If no secondary cooling period is detected, method 400 may proceed to 440. At 440, method 400 may include determining and/or indicating the total quantity of fuel dispensed based on the duration of the primary cooling period. Determining the total quantity of fuel dispensed may include accessing a lookup table or algorithm stored on controller 12. Method 400 may then proceed to 455.

Returning to 435, if a secondary cooling period is detected, method 400 may proceed to 445. At 445, method 400 may include determining and/or indicating the duration of the secondary cooling period. The secondary cooling period may begin with the re-dispensing of fuel following an initial shut-off event, and may end when the fuel dispenser is shut off for a second time. The duration of the secondary cooling period may be may be quantified by determining the amount of time between a second set of inflection points (following the first set of inflection points) in the canister temperature sensor profile, where the temperature is decreasing. In some cases, there may be additional cooling periods following the secondary cooling period, such as in the case of repeatedly trickle-filling the fuel tank. In such events, tertiary, quarternary, etc. cooling periods may be identified, and the respective durations quantified. Method 400 may then proceed to 450.

At 450, method 400 may include determining the total fuel dispensed based on the durations of the primary and secondary cooling periods. Determining the total quantity of fuel dispensed may include accessing a lookup table or algorithm stored on controller 12. Method 400 may then proceed to 455.

At 455, method 400 may include updating and/or indicating the fill level based on the total fuel dispensed, as determined at 440 or 450. For fill levels where the fuel level sensor measures less than 100%, the total fuel dispensed calculations may be used to confirm the fuel level sensor reading. If the calculated fill level is within a threshold amount of the fuel level sensor reading, controller 12 may rely on the fuel level sensor reading until the next refueling event. If the fuel level sensor reports a fuel level that differs from the calculated fill level by a threshold amount, a flag may be set indicating a fault with the fuel level sensor.

For fill levels where the fuel level sensor measures 100% full, the total fuel dispensed calculations may be used to determine the actual or "true" fuel level in fuel tank 20. While a dashboard fuel gauge may still read "Full", the actual fuel level may be recorded and relied upon by controller 12 until the fuel level sensor reports a fill level of less than 100%. Method 400 may then proceed to 460.

At 460, method 400 may include updating parameters based on the actual fill level, as determined at 455. A more detailed description and set of examples are described further herein and with regards to FIGS. 5A-5B. Briefly, if the actual fill level is greater than 100% of the maximum fill level, the true fill level may be used for downstream calculations, such as miles-to-empty, for example. The true fill level may also be used to prevent unnecessary malfunction flags being set based on the overabundance of fuel, such as fuel level sensor malfunction flags. Method 400 may then end.

FIG. 5A shows a high-level flow chart for an example method 500 for determining and/or indicating the expected driving range of a vehicle based on the amount of fuel in the fuel tank. This distance may be referred to herein as "miles-to-empty", but similar calculations may be made for other measures of length, such as kilometers, furlongs, leagues, etc. Method 500 may be implemented independently, or may be executed as a subroutine for another method, for example method 400 as described herein. Method 500 will be described herein with reference to the components and systems depicted in FIGS. 1 and 2, though it should be understood that the method may be applied to other systems without departing from the scope of this disclosure. Method 500 may be carried out by controller 12, and may be stored as executable instructions in non-transitory memory.

Method 500 may begin at 505. At 505, method 500 may include evaluating operating conditions. Operating conditions may include, but are not limited to, engine status, engine load, engine speed, fuel level, etc. Continuing at 510, method 500 may include determining whether the fuel level sensor reading is greater than or equal to 100% of the maximum fill level. If the fuel level sensor reading is less than 100% of the maximum fill level, method 500 may proceed to 515. At 515, method 500 may include calculating the number of miles-to-empty based on the fuel level sensor reading, and further based on the operating conditions, such as engine speed, engine load, etc. Miles-to-empty may be calculated with the assumption that the current engine operating conditions are maintained indefinitely, and/or based on the operator's driving tendencies, a planned route (such as a destination entered into an on-board GPS), etc.

Returning to 510, if it is determined that fuel level sensor reading is greater than or equal to 100% of the maximum fill level, method 500 may proceed to 520. At 520, method 500 may include determining and/or indicating the true fuel fill level. Determining the true fuel fill level may include accessing the fill level calculations from the most recent refueling event, as described herein and with regards to FIG. 4, for example. In some scenarios, method 500 may be run immediately following a refueling event. In such cases, the fuel level determined during refueling may be used as the true fuel fill level. In other scenarios, method 500 may be run after a duration following the refueling event. In such cases, controller 12 may access the fuel level determined during refueling, and may determine and/or indicate the amount of fuel that has been expended following the refueling event. For example controller 12 may sum injector commanded pulse widths to estimate the amount of fuel expended. The amount of fuel expended may be subtracted from the fuel level determined during refueling to determine the true fuel fill level. Method 500 may then proceed to 525.

At 525, method 500 may include calculating the number of miles-to-empty based on the true fuel fill level, and further based on the operating conditions, such as engine speed, engine load, etc. as described with regard to 515. Following the calculation of the miles-to-empty parameter, (whether based on a fuel level sensor or a true fuel fill level) method 500 may proceed to 530. At 530, method 500 may include indicating the calculated miles to empty, for example, by displaying the calculated miles-to-empty on the dashboard of the vehicle. Method 500 may then end. Implementing method 500 thus imparts the advantage that the miles-to-empty calculation will have increased accuracy under conditions where fuel level is greater than 100% of the maximum fuel level.

Method 500 may be run continuously, or whenever the vehicle operator has requested the miles-to-empty parameter. In practice, miles-to-empty may be calculated based on the true fuel fill level while the fuel level sensor reads greater than or equal to 100% of the maximum fill level, and may be calculated based on the fuel level sensor reading when the fuel level sensor reads less than 100% of the maximum fill level. In some examples, a true fill level reading may be calculated based on the estimated fuel consumed by the vehicle regardless of the fuel sensor reading, in order to eliminate confusion, for example, if the fuel level sensor changes rapidly above a threshold amount, due to fuel sloshing, or due to the vehicle driving up or down a steep gradient, for example.

FIG. 5B shows a high-level flow chart for an example method 550 for determining and/or indicating the integrity of a fuel level sensor. Method 550 may be implemented independently, or may be executed as a subroutine for another method, for example method 400 as described herein. Method 500 will be described herein with reference to the components and systems depicted in FIGS. 1 and 2, though it should be understood that the method may be applied to other systems without departing from the scope of this disclosure. Method 550 may be carried out by controller 12, and may be stored as executable instructions in non-transitory memory.

Method 550 may begin at 555. At 555, method 550 may include evaluating operating conditions. Operating conditions may include, but are not limited to, engine status, engine load, engine speed, fuel level, etc. Continuing at 560, method 550 may include determining whether the fuel level sensor reading is greater than or equal to 100% of the maximum fill level. If the fuel level sensor reading is less than 100% of the maximum fill level, method 550 may proceed to 565.

At 565, method 500 may include performing fuel level sensor diagnostics based on fuel level sensor readings. If the fuel level sensor reads less than 100% of the maximum fill level, it is expected that the fuel level sensor reading will decrease in accordance with the amount of fuel consumed. Fuel level sensor diagnostics may include determining the current fuel level as indicated by the fuel level sensor, monitoring the amount of fuel consumed for a duration (for example, by summing injector commanded pulse widths over the duration) and determining whether the updated fuel level sensor reading reflects the expected amount of fuel in the fuel tank. Method 550 may then end.

Returning to 560, if it is determined that fuel level sensor reading is greater than or equal to 100% of the maximum fill level, method 550 may proceed to 570. At 570, method 550 may include determining the true fuel fill level, as described herein with regards to FIG. 5A. Continuing at 575, method 550 may include calculating the amount of fuel in the fuel tank above the maximum fill level, for example, by subtracting the maximum fill level from the true fill level.

Continuing at 580, method 550 may include updating the true fuel fill level based on the amount of fuel expended. While the engine is operated, fuel injection amounts may be calculated, summed, and subtracted from the true fuel fill level. The true fuel fill level may be continuously updated, for at least until it is expected that the true fuel fill level is less than 100% of the maximum fuel fill level.

Continuing at 585, method 550 may include suspending fuel level sensor diagnostics until the true fuel fill level is less than 100% of the maximum fuel fill level. Method 550 may then end. In some examples, method 550 may return to 565, and perform fuel level sensor diagnostics based on fuel level sensor readings. If the true fuel fill level is greater than 100% of the maximum fuel fill level, the fuel level sensor readings may be expected to remain the same, even as fuel is expended. By suspending fuel level sensor diagnostics until the fuel level is less than 100% of the maximum fuel fill level, misdiagnoses of a stuck fuel level sensor may be reduced.

The systems depicted in FIGS. 1 and 2, in conjunction with the methods described herein and depicted in FIGS. 4, 5A, and 5B may enable one or more systems and one or more methods. In one example, a method for a vehicle, comprising: indicating a true fill level of a fuel tank based on a fuel vapor canister temperature profile during a refueling event. In some embodiments, indicating a true fill level of a fuel tank based on a fuel vapor canister temperature profile during a refueling event may further include: indicating a first quantity of fuel dispensed into the fuel tank based on a first cooling duration within the fuel vapor canister temperature profile. Indicating a true fill level of a fuel tank based on a fuel vapor canister temperature profile during a refueling event may further include: indicating a second quantity of fuel dispensed into the fuel tank based on a second cooling duration, following the first cooling duration within the fuel vapor canister temperature profile. In some embodiments, indicating a true fill level of a fuel tank based on a fuel vapor canister temperature profile during a refueling event further includes: indicating a sum of the first quantity of fuel dispensed into the fuel tank, the second quantity of fuel dispensed into the fuel tank, and a fill level immediately prior to refueling. The fuel vapor canister temperature profile may be based on readings from a temperature sensor coupled to a load side of a fuel vapor canister. In some examples, the temperature sensor coupled to the load side of the fuel vapor canister is located within a central cavity of the fuel vapor canister at a distance of 5 mm from a loading conduit. The method may further comprise: under a first condition, indicating an expected driving range for the vehicle based on the true fill level, and not based on a fill level indicated by a fuel level sensor coupled within the fuel tank. The first condition may comprise a true fill level greater than a fill level indicated by the fuel level sensor coupled within the fuel tank. In some embodiments, the method may further comprise: under a first condition, executing a diagnostic test based on the true fill level. In some examples, the first condition comprises a true fill level greater than a fill level indicated via a fuel level sensor coupled within the fuel tank. The diagnostic test may be a fuel level sensor integrity test. The technical result of implementing this method is an accurate indication of the quantity of fuel within a fuel tank dispensed over the maximum fill level of the fuel tank. In scenarios where the fuel tank is "trickle-filled" above the maximum fill level, the fuel level sensor may only indicate that the tank is filled to 100% of the maximum fill level, even if more fuel is present. By accurately indicating the amount of fuel dispensed during a refueling event, the true fill level may be determined, regardless of the fuel level sensor reading.

In another example, a system for a vehicle, comprising: a fuel vapor canister coupled to a fuel tank; a temperature sensor coupled to a load side of the fuel vapor canister; and a controller configured with executable instructions stored in non-transitory memory, that when executed, cause the controller to: monitor a temperature profile at the temperature sensor during a refueling event; determine a duration of a first cooling period of the temperature profile; determine a duration of a second cooling period of the temperature profile; determine a first quantity of fuel dispensed into the fuel tank based on the duration of the first cooling period; determine a second quantity of fuel dispensed into the fuel tank based on the duration of the second cooling period; and determine a true fill level of a fuel tank based on a sum of the first quantity of fuel, the second quantity of fuel, and a fill level immediately prior to refueling. The fill level immediately prior to refueling may be determined via a fill level sensor coupled within the fuel tank. In some embodiments, the controller may further comprise executable instructions stored in non-transitory memory, that when executed, cause the controller to: under a first condition, determine an expected driving range for the vehicle based on the true fill level, and not based on a fill level indicated by a fuel level sensor coupled within the fuel tank; and under the first condition, execute a diagnostic test based on the true fill level. The first condition may comprise a true fill level greater than a fill level determined via the fuel level sensor coupled within the fuel tank. The diagnostic test may be a fuel level sensor integrity test. In some embodiments, the temperature sensor coupled to the load side of the fuel vapor canister is an only temperature sensor coupled to the fuel vapor canister. The technical result of implementing this system is a robust means of determining the amount of fuel dispensed into a fuel tank via a temperature sensor disposed at the load side of a fuel vapor canister. The fuel vapor entering the fuel vapor canister during a refueling event may be leveraged to determine the amount of fuel dispensed into the fuel tank. The cooling periods observed by the load-side temperature sensor are proportionate to the amount of fuel dispensed. Thus, even if fuel is added to the ullage space of the fuel tank, an accurate assessment of the tank fill level can be obtained.

In yet another example, a method for a fuel system of a vehicle, comprising: monitoring a temperature profile at a temperature sensor coupled to a load side of a fuel vapor canister during a refueling event; determining a duration of a first cooling period of the temperature profile; determining a duration of a second cooling period of the temperature profile; determining a first quantity of fuel dispensed into a fuel tank based on the duration of the first cooling period; determining a second quantity of fuel dispensed into the fuel tank based on the duration of the second cooling period; determining a true fill level of a fuel tank based on a sum of the first quantity of fuel, the second quantity of fuel, and a fill level immediately prior to refueling; under a first condition, determining an expected driving range for the vehicle based on the true fill level, and not based on the fill level indicated by a fuel level sensor coupled within the fuel tank; and under the first condition, executing a diagnostic test based on the true fill level. The first condition may comprise a true fill level greater than a fill level determined via the fuel level sensor coupled within the fuel tank. In some examples, the diagnostic test is a fuel level sensor integrity test. The technical result of implementing this method is an increase in accuracy and robustness of downstream calculations and parameters that are based on the fuel fill level. With this method, an expected driving range for a vehicle may take into consideration all of the fuel in the fuel tank, whereas current methods only consider fuel up to the maximum fill level, as indicated by a fuel level sensor. Diagnostic test that depend on changes in fuel level may be performed more robustly, even when the fuel level sensor reads 100% of maximum tank capacity despite fuel being present in the fuel tank ullage space above 100% of maximum tank capacity.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining a true fill level of a vehicle, comprising:
    via a controller of the vehicle,
        monitoring a fuel vapor canister temperature profile during a refueling event; and
        determining that the true fill level of a fuel tank of the vehicle is greater than or equal to a maximum fill level of the fuel tank based on the fuel vapor canister temperature profile,
        wherein the fuel vapor canister temperature profile first increases and then decreases during the refueling event.

2. The method of claim 1, where the fuel vapor canister temperature profile is based on readings from a temperature sensor coupled to a load side of a fuel vapor canister.

3. The method of claim 2, where the temperature sensor coupled to the load side of the fuel vapor canister is located within a central cavity of the fuel vapor canister at a distance of 5 mm from a loading conduit.

4. The method of claim 2, further comprising:
    observing a first temperature increase in the fuel vapor canister temperature profile;
    observing a first temperature decrease in the fuel vapor canister temperature profile;
    observing a second temperature increase in the fuel vapor canister temperature profile; and
    observing a second temperature decrease in the fuel vapor canister temperature profile,
    wherein the determination that the true fill level of the fuel tank is greater than or equal to the maximum fill level of the fuel tank is based on the second temperature decrease being observed.

5. The method of claim 1, further comprising:
    not basing an expected driving range for the vehicle based on a fill level indicated by a fuel level sensor coupled within the fuel tank.

6. The method of claim 5, where the expected driving range for the vehicle is not based on the fill level indicated by the fuel level sensor coupled within the fuel tank responsive to the true fill level being greater than the fill level indicated by the fuel level sensor coupled within the fuel tank.

7. The method of claim 1, further comprising:
    executing a diagnostic test based on the true fill level.

8. The method of claim 7, where the execution is performed with the true fill level being greater than a fill level indicated via a fuel level sensor coupled within the fuel tank.

9. The method of claim 8, where the diagnostic test is a fuel level sensor integrity test.

10. A system for a vehicle, comprising:
    a fuel vapor canister coupled to a fuel tank;
    a temperature sensor coupled to a load side of the fuel vapor canister;
    a visual display to an operator of the vehicle; and
    a controller configured with executable instructions stored in non-transitory memory that, when executed, cause the controller to:
        monitor a temperature profile at the temperature sensor during a refueling event,
        wherein the temperature profile includes a first cooling period of the temperature profile, the first cooling period including a temperature decrease after a first temperature increase, and
        wherein the temperature profile includes a second cooling period, the second cooling period including a second temperature decrease, and the second cooling period following the first cooling period; and
        determine a true fill level of the fuel tank that is greater than a maximum fill level of the fuel tank based on the temperature profile.

11. The system of claim 10, where a fill level immediately prior to refueling is determined via a fuel level sensor coupled within the fuel tank.

12. The system of claim 10, where the controller further comprises executable instructions stored in non-transitory memory that, when executed, cause the controller to:
    under a first condition, not base an expected driving range on a fill level indicated by a fuel level sensor coupled within the fuel tank; and
    under the first condition, execute a diagnostic test based on the true fill level.

13. The system of claim 12, where the first condition comprises the true fill level being greater than the fill level indicated via the fuel level sensor coupled within the fuel tank.

14. The system of claim 13, where the diagnostic test is a fuel level sensor integrity test.

15. The system of claim 10, where the temperature sensor coupled to the load side of the fuel vapor canister is an only temperature sensor coupled to the fuel vapor canister.

16. The system of claim 10,
wherein the temperature profile includes a first heating period, the first heating period including the first temperature increase;
wherein the temperature profile includes a second heating period, the second heating period including a second temperature increase;
wherein the temperature decrease of the second cooling period is after the second temperature increase; and
wherein the determination that the true fill level of the fuel tank is greater than the maximum fill level of the fuel tank is based on the temperature sensor detecting the second cooling period during the refueling event.

17. A method for determining a true fill level of a fuel system of a vehicle, comprising:
via a controller,
monitoring a temperature profile at a temperature sensor coupled to a load side of a fuel vapor canister during a refueling event,
wherein the temperature profile includes a first cooling period, the first cooling period including a temperature decrease following an initial temperature increase, and
wherein the temperature profile further includes a second cooling period, the second cooling period following the first cooling period, and the second cooling period including a second temperature decrease;
determining that the true fill level of a fuel tank is greater than a maximum fill level of the fuel tank based on the temperature profile;
under a first condition, not basing an expected driving range on a fill level indicated by a fuel level sensor coupled within the fuel tank; and
under the first condition, executing a diagnostic test based on the true fill level.

18. The method of claim 17, where the first condition comprises the true fill level being greater than the fill level indicated by the fuel level sensor coupled within the fuel tank.

19. The method of claim 18, where the diagnostic test is a fuel level sensor integrity test.

20. The method of claim 17,
wherein the temperature profile includes a first heating period, the first heating period including the initial temperature increase;
wherein the temperature profile includes a second heating period, the second heating period including an additional temperature increase;
wherein the second temperature decrease of the second cooling period follows the additional temperature increase; and
wherein the determination that the true fill level of the fuel tank is greater than the maximum fill level of the fuel tank is based on the temperature sensor registering the second temperature decrease of the second cooling period of the temperature profile.

* * * * *